United States Patent [19]
Harris et al.

[11] Patent Number: 5,480,055
[45] Date of Patent: Jan. 2, 1996

[54] QUICK-ON CAP WITH REMOVAL DELAY MECHANISM

[75] Inventors: Robert S. Harris; Jeffery Griffin, both of Connersville, Ind.

[73] Assignee: Stant Manufacturing Inc., Connersville, Ind.

[21] Appl. No.: 239,217

[22] Filed: May 6, 1994

[51] Int. Cl.⁶ .................................................. B65D 51/16
[52] U.S. Cl. ................ 220/203.26; 220/303; 220/304; 220/DIG. 33
[58] Field of Search .................................. 220/203, 209, 220/297, 300, 301, 303, DIG. 33, 203.06, 203.07

[56] References Cited

U.S. PATENT DOCUMENTS

| | | | |
|---|---|---|---|
| 1,738,893 | 12/1929 | Grady | 220/301 |
| 4,000,633 | 1/1977 | Evans | 220/303 |
| 4,676,390 | 6/1987 | Harris | 220/303 |
| 5,108,001 | 4/1992 | Harris | 220/303 |
| 5,110,003 | 5/1992 | MacWilliams | 220/303 |
| 5,395,004 | 3/1995 | Griffin | 220/300 |

*Primary Examiner*—David Scherbel
*Assistant Examiner*—Terrence R. Till
*Attorney, Agent, or Firm*—Barnes & Thornburg

[57] ABSTRACT

A quick-on cap includes a closure body for engaging a filler neck and a handle for rotating closure body. Cap also includes a control mechanism for initially providing a lost-motion driving connection between closure body and handle during cap removal and always providing a direct-drive driving connection during cap installation.

24 Claims, 7 Drawing Sheets

QUICK-ON CAP WITH REMOVAL DELAY MECHANISM

BACKGROUND AND SUMMARY OF THE INVENTION

The present invention relates to a cap for closing the mouth of a filler neck, and in particular, to fuel caps for closing the filler neck of a vehicle fuel tank. More particularly, the present invention relates to a cap including an attachment mechanism for enabling a user to attach the cap to the filler neck quickly and easily and establish a sealed connection between the cap and the filler neck.

Conventional fuel caps for closing the filler neck of a vehicle fuel tank typically include a closure member for closing the mouth of the filler neck and a handle for turning the closure member to mount the closure member in the filler neck. Partial-turn cam-on caps and multiple-turn threaded caps are well-known types of caps for use in closing filler necks. Although such caps are currently in widespread use, it would be desirable to provide an alternative cap that is simpler to install on and remove from a filler neck.

It is known to provide a cam-on cap of the type having a shank portion which extends into the filler neck and is provided with pairs of conventional circumferentially spaced-apart cam lugs as disclosed in U.S. Pat. No. 4,887,733, to Harris. These cam lugs operate in the customary way to engage a filler neck configured to receive a cam-on cap and retain the cap in a fully tightened position closing the open mouth of the filler neck.

Alternatively, a conventional multiple-turn cap includes a closure member that is threaded to be screwed into a threaded filler neck. For example, U.S. Pat. No. 3,820,680, to Friend discloses a multiple-turn threaded cap and a compatible threaded filler neck. Typically, a multiple-turn threaded cap must be turned at least two and one-half or three full revolutions by the user after it is inserted into the threaded filler neck to connect the cap to the filler neck and establish a liquid and vapor seal between the cap and the filler neck.

More and more vehicle drivers are using the self-service bays at gasoline stations and filling their own fuel tanks. Some people have found that it is difficult to remove and install a conventional filler neck cap during refueling. A cap that is readily installable on and removable from a filler neck by a user without a lot of effort and that is configured to establish a sturdy sealed connection between the cap and the filler neck consistently during use would be a welcomed improvement over conventional caps.

One problem with many conventional filler neck caps is that, because the handle is directly connected to the filler neck closure means, any unintentional movement of the handle in the cap-removal direction will break the seal between the closure means and the filler neck. Once the seal between the closure means and the filler neck is broken, it is possible for fuel or fuel vapor to escape from the filler neck. In some instances, such as during a vehicle accident, a release of fuel or fuel vapor can potentially create a hazardous condition.

It is known to provide a filler neck cap having a lost-motion driving connection between the handle and the closure means. See, for example, U.S. Pat. No. 4,765,505, to Harris and U.S. application No. 08/138,397, to Harris, filed on Oct. 18, 1993. These caps are designed to allow the cap handle to rotate freely relative to the closure means in both the cap-installation direction and the cap-removal direction. In some cases, a user might be inconvenienced by a cap that provides a lost-motion driving connection during cap installation as well as during cap removal. What is needed is a quick-on cap that is automatically set to have a direct-drive driving connection between the handle and closure means during cap installation and to have a lost-motion driving connection between the handle and closure means during cap removal. Such a cap would be easy to install yet incorporate a lost-motion feature that functions to prevent loss of cap seal if the cap handle is rotated inadvertently in a cap-removal direction during vehicle impact or during stress relief of vehicle components.

According to the present invention, a quick-on cap is provided for engaging a filler neck. The cap includes closure means for engaging a filler neck and handle means for rotating the closure means relative to the filler neck in either a cap-installation direction toward the filler neck to install the cap on the filler neck or a cap-removal direction away from the filler neck to remove the cap from the filler neck.

The quick-on cap also includes control means for initially providing a lost-motion driving connection during cap removal and always providing a direct-drive driving connection during cap installation. The lost-motion driving connection is established temporarily between the handle means and the closure means during initial rotation of the handle means about an axis of rotation relative to the filler neck in a cap-removal direction. The direct-drive driving connection is always established between the handle means and the closure means during rotation of the handle means about the axis of rotation in a cap-installation direction.

In preferred embodiments, the quick-on cap is a fuel cap and the filler neck is connected to a vehicle fuel tank. The control means includes a torsion spring mounted inside the cap and coupled to the closure means and the handle means. The control means also includes a drive lug coupled to the handle means and a driven lug coupled to the closure means. The torsion spring includes a top finger coupled to a top spring mount provided on the underside of the handle means, a bottom finger coupled to a bottom spring mount provided on the top side of the closure means, and a coiled portion interconnecting the top and bottom fingers. The torsion spring has a central axis and is oriented preferably to lie between the handle means and the underlying closure means so that its central axis is aligned in parallel relation to the axis of rotation of the handle means. It will be understood that the control means feature and/or the torsion spring feature could be applied to a threaded cap or a cam-on cap or other suitable closure mechanism.

During cap installation, the user always turns the closure means in the filler neck in a cap-installation or cap-advancing direction directly by turning the handle means about its axis of rotation. The cap is called a "quick-on" cap because a user need only turn the handle one-twelfth of a turn (30°) in a clockwise direction once the cap is inserted into the filler neck to anchor the cap in a sealed filler neck-closing position.

Each time the quick-on cap is removed from a filler neck, it instantly and automatically "resets" itself so that a direct-drive driving connection between the handle means and the closure means is established to facilitate reinstallation of the quick-on cap on the filler neck. This reset function is achieved by automatic operation of the torsion spring to rotate the closure means relative to the handle means.

Upon removal of the cap from a filler neck, while the user is still gripping the cap by holding onto the handle means, the torsion spring inside the cap functions to rotate the closure means about the axis of rotation relative to the handle means until the drive lug on the handle means engages the driven lug on the closure means. This lug-to-lug engagement establishes a direct-drive driving connection between the handle means and the closure means for use during cap installation. In other words, the torsion spring applies a spring force which biases the driven lug against the drive lug to establish a direct-drive driving connection automatically before and during each cap installation. One benefit to the user of such a direct-drive feature is that any rotation of the cap handle in a cap-advancing direction by the user during cap installation will cause the cap closure means to turn in the filler neck so that the user can positively and quickly install the quick-on cap in the filler neck without any "lost motion" between the handle means and the closure means.

Advantageously, the torsion spring provides a direct-drive driving connection before and during cap installation without disrupting a lost-motion driving connection that is established between the handle means and closure means during an initial stage of cap removal. A sealing ring is mounted on the closure means and trapped between the closure means and the filler neck upon rotation of the closure means to its tightened filler neck-closing position. When the handle means is initially rotated by a user in a counterclockwise cap-removal direction, the handle means is permitted to rotate through a predetermined "lost motion" angle, e.g., 60°, relative to the closure means before establishing a direct-drive driving connection therewith to delay breaking a seal between the closure means and the filler neck. Once the direct-drive driving connection is established, further counterclockwise rotation of the handle means will cause the closure means to rotate in the filler neck from its sealed filler neck-closing position to an unsealed position. This "lost motion" feature advantageously aids in increasing the crashworthiness of the quick-on cap by lessening the likelihood that the cap will loosen an amount sufficient to break the seal during an accidental impact.

During cap removal, the user begins to turn the handle means in a counterclockwise direction relative to the filler neck against the biasing force generated by the torsion spring. Even though the user is turning the spring-loaded handle means about its axis of rotation, the closure means remains fixed in its sealed filler neck-closing position due to the lost-motion driving connection between the handle means and the closure means. Once the handle means is rotated in a cap-removal direction through a predetermined lost motion angle, e.g., 60°, the drive lug on the underside of the handle means is moved into engagement with the driven lug on the top side of the closure means. From this point on, a direct-drive driving connection is established and continued rotation of the handle means in a cap-removal direction causes rotation of the closure means relative to the filler neck in a cap-removal direction until the seal between the closure means and the filler neck is broken and later the cap is finally separated from the filler neck. It is only necessary to rotate the handle means another one-twelfth of a turn, e.g., 30°, in the counterclockwise cap-removal direction to disengage the closure means from the filler neck so that the cap can be removed to permit vehicle refueling.

Advantageously, the torsion spring functions to rotate the closure means relative to the handle means automatically after removal of the cap from the filler neck so that a lost-motion driving connection is not present and apparent to a user during installation of the cap in the filler neck. Thus, a direct-drive driving connection between the handle means and closure means is automatically established during cap installation without disabling a lost-motion driving connection that is always established between the handle means and closure means during an initial stage of cap removal.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

A quick-on cap in accordance with the present invention can be installed on a compatible filler neck by inserting the closure body of the cap into the mouth of the filler neck and turning the handle cover of the cap 30° in a clockwise cap-advancing direction. To remove the cap, the handle cover is rotated through a 60° first lost-motion stage angle relative to the mounted sealed closure body in a counterclockwise cap-removal direction and then the handle cover and closure body are rotated together as a unit through a 30° second direct-drive stage angle relative to the filler neck also in a counterclockwise cap-removal direction. Once removed from the filler neck, the cap automatically resets itself in the manner described below so that a direct-drive connection is established between the handle cover and the closure body during cap installation.

Advantageously, the closure body is rotated relative to the handle cover automatically after removal of the cap from the filler neck by an innovative cap control means so that a lost-motion driving connection is not present and apparent to a user during installation of the cap in the filler neck. Further, this direct-drive driving connection exists before and during cap installation without disrupting a lost-motion driving connection that is established between the handle cover and the closure body during an initial stage of cap removal.

Figure 1:
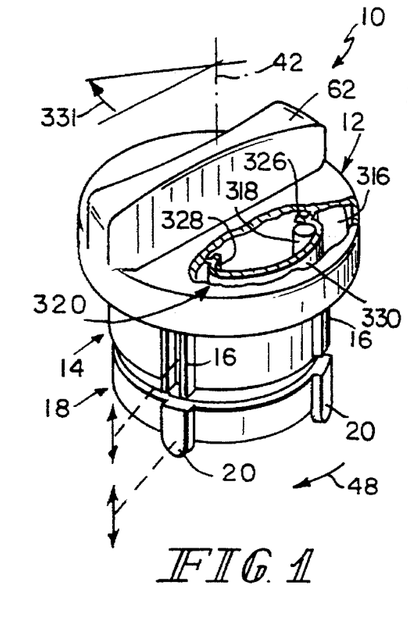
FIG. 1 is a perspective view of a quick-on cap according to the present invention showing the configuration of the cap before it is installed in a filler neck and showing a closure body and an overlying handle cover, with portions broken away, to reveal a cylindrical driven lug appended to the closure body underneath the handle and cover and arranged to engage one end of a C-shaped drive lug appended to the handle cover so that a direct-drive driving connection is established between the handle cover and the filler neck closure means.

A quick-on cap 10 in accordance with the present invention is shown in FIG. 1 as it would appear to a user about to insert cap 10 into a filler neck. Cap 10 includes a handle cover 12, a sleeve 14 having three radially outwardly projecting, axially extending, and circumferentially spaced-apart ribs 16, and a core 18 having three radially outwardly projecting and circumferentially spaced-apart retaining lugs 20. The sleeve 14 and the core 18 cooperate to define a closure body underneath handle cover 12.

Figure 2:
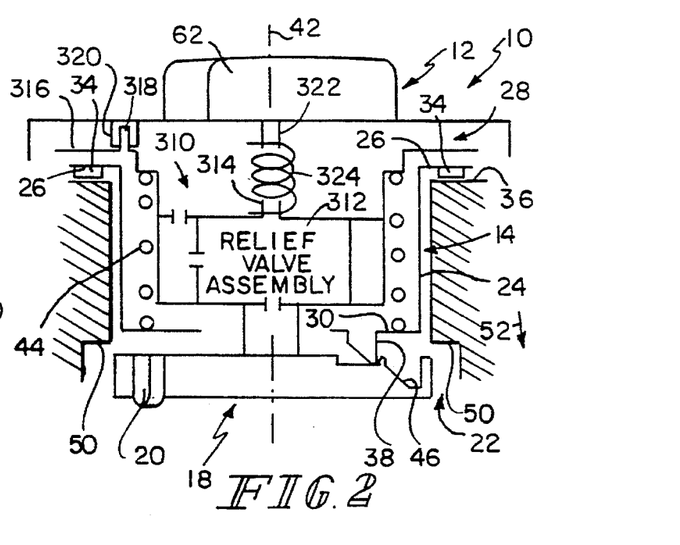
FIG. 2 is a diagrammatic view of the cap of FIG. 1 in an unsealed loosened position just after it has been inserted into a filler neck showing a torsion spring having a top finger coupled to the handle cover, a bottom finger coupled to the closure body, and a coiled portion interconnecting the top and bottom fingers.

Initially, as shown in FIG. 1, the ribs 16 are axially aligned with the retaining lugs 20 to permit a user to insert the cap 10 into the filler neck 22 shown diagrammatically in FIG. 2. This filler neck 22 is formed to include three circumferentially spaced-apart, axially extending slots (not shown in FIG. 2—see, for example, FIG. 10) for receiving the three aligned pairs of ribs 16 and retaining lugs 20 during insertion of cap 10 into filler neck 22.

It will be appreciated that the axially extending slots in the filler neck for receiving the three aligned pairs of ribs 16 and retaining lugs 20 during insertion of cap 10 into the filler neck constitute a gripping portion of the filler neck disposed axially inwardly from the mouth internally in the neck. This gripping portion internally in the filler neck may take any number of forms including radially-inwardly extending abutments or flanges. The ribs 16 constitute means for engaging such filler neck abutments or flanges to prevent rotation of the sleeve in the filler neck. Similarly, the spaced-apart retaining lugs 20 on the core 18 may constitute means for engaging such filler neck abutments or flanges to prevent axial outward movement of the cap from the filler neck. It will be appreciated that such engaging means, i.e, corresponding to the retaining lugs 20, may take any number of forms to cooperate with such abutments or flanges in the filler neck.

Essentially, therefore, the quick-on cap 10 of the present invention includes means for engaging the sleeve 14 to the filler neck 22 to permit axial insertion and axial movement of the sleeve 14 in the filler neck 22 but not rotation of the sleeve 14 within the filler neck 22 as well as means for engaging the core 18 with the filler neck 22 once the core 18 is rotated in a cap-installation direction relative to the sleeve 14 to prevent axial outward movement of the cap 10 from the filler neck 22.

Figure 4:
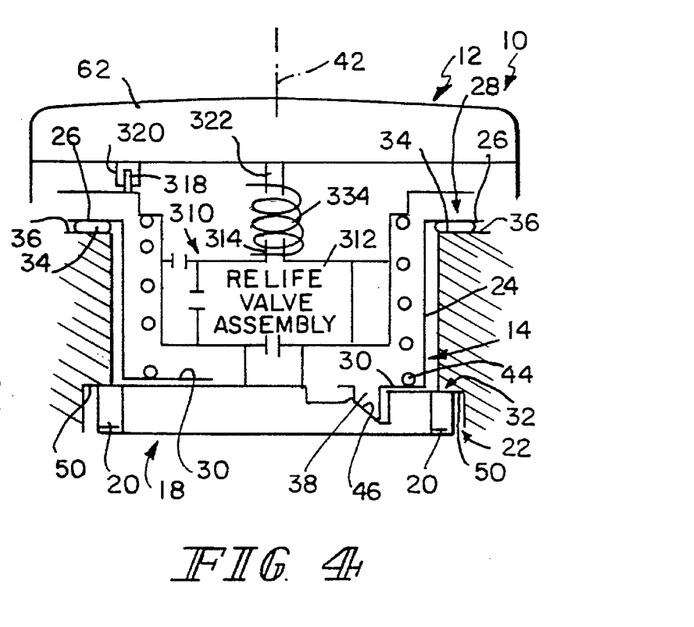
FIG. 4 is a diagrammatic view of the cap of FIG. 3 in place in the filler neck showing compression of a sealing ring carried on the closure body to establish a liquid fuel and fuel vapor seal between the closure body and the filler neck.

As shown diagrammatically in FIGS. 2 and 4, the sleeve 14 includes a cylindrical body 24 including a radially outwardly extending annular top flange 26 at the outer end 28 and a radially inwardly extending annular bottom flange 30 at the inner end 32. An annular sealing ring 34 is carried by annular top flange 26 so that it can be pressed as shown in FIG. 4 against an annular rim 36 at the outer edge of filler neck 22 to establish a fuel vapor seal therebetween during installation of cap 10 on filler neck 22. At least one cam follower 38 is appended to the annular bottom flange 30 of sleeve 14 to engage a portion of core 18.

As shown diagrammatically in FIGS. 2 and 4, core 18 is coupled to handle cover 12 by coupling means (described in detail below) so that the core 18 will rotate about its axis 42 in response to manual rotation of handle cover 12 about axis 42 during installation and removal of filler neck cap 10. It will become clear that a direct-drive driving connection between handle cover 12 and sleeve 14 is always established during cap installation. A compression spring 44 is provided inside cap 10 for urging the sleeve 14 and core 18 in opposite directions so that each cam follower 38 on the inner end 32 of sleeve 14 is yieldably biased against an underlying cam 46 formed on core 18.

As shown diagrammatically in FIGS. 2 and 4, core 18 includes a valve housing 310 containing a relief valve assembly 312, a bottom spring mount 314 on top of valve housing 310, and an upper plate 316 around the top of valve housing 310. A cylindrical driven lug 318 is appended to upper plate 316 and arranged to be engaged by a C-shaped drive lug 320 appended to the underside of handle cover 12. A top spring mount 322 is also appended to the underside of handle cover 12 and a torsion spring 324 is positioned inside cap 10 to interconnect the top spring mount 322 on handle cover 12 and the bottom spring mount 324 on core 18.

The C-shaped drive lug 320 includes a first arm 326, a second arm 328, and an elongated annular body 330 interconnecting the first and second arms 326, 328. The first arm 326 provides installation drive means for engaging a companion cylindrical driven lug 318 during rotation of the handle cover 12 about axis of rotation 42 in the cap-advancing direction to rotate the core 18 in a clockwise installation direction in the filler neck 22 as shown, for example, in FIGS. 1–4, 15, and 16. The second arm 328 provides removal drive means for engaging the same cylindrical driven lug 318 at a predetermined point during rotation of the handle cover 12 about axis of rotation 42 in the cap-removal direction to rotate core 18 in a counterclockwise removal direction in the filler neck 22 as shown, for example, in FIGS. 7, 8, 18, and 19.

It will become clear as this description progresses that the spacing between the first and second arms 326, 328 of the C-shaped drive lug 320 controls the amount of "lost motion" generated in cap 10 during a first stage of cap removal before a direct-drive driving connection is established during a second stage of cap removal. In addition, the torsion spring 324 functions to turn core 18 relative to handle cover 12 each time cap 10 is removed from filler neck 12 to "reset" the cap 10 automatically so that a direct-drive relationship between handle cover 12 and core 18 is established before and during each cap-installation activity.

In use, quick-on cap 10 is easily installed on filler neck 20 to establish a fuel vapor seal between the cap 10 and filler neck 22 by taking the cap 10 shown in FIG. 1, inserting it axially into the filler neck 22 as shown diagrammatically in FIG. 2 to position the annular sealing ring 34 carried on the top flange 26 of sleeve 14 opposite to the annular rim 36 on filler neck 22, and then rotating the handle cover 12 one-twelfth of a revolution (30°) about axis 42 through a direct-drive angle 331 in a clockwise or cap-installation direction 48. Such rotation of handle cover 12 rotates the core 18 relative to sleeve 14 to move retaining lugs 20 into engagement with internal flanges 50 formed in filler neck 22.

Ribs 16 on sleeve 14 function as anti-rotation ribs because they engage other internal flanges (shown in FIG. 8) in filler neck 22 to block rotation of sleeve 14 relative to filler neck 22 during rotation of handle cover 12 and core 18 relative to filler neck 22.

At the same time, rotation of core 18 about axis 42 rotates the cam 46 relative to the spring-loaded cam follower 38 so that spring 44 is "released" to move the sleeve 14 from the position shown in FIG. 2 further into the filler neck 22 in axially inward direction 52 to the position shown in FIG. 4. This inward movement of the sleeve 14 causes the annular top flange 26 on sleeve 14 to move in inward direction 52 toward the annular rim 36 on filler neck 22 to compress the annular sealing ring 34 tightly between cap 10 and filler neck 22 and establish a fuel vapor seal. In effect, the sleeve 14 and core 18 cooperate to grip the filler neck 22 so that the sealing ring 34 is compressed between the sleeve 14 and the filler neck 22 in response to movement of the core 18 relative to the sleeve in a cap-installation direction. Reference is hereby made to Griffin and Harris U.S. patent application No. 07/948,096, entitled "Quick-On Fuel Cap" and filed on Sep. 21, 1992, which is incorporated by reference herein, for a detailed description of the means and manner for mounting cap 10 on a filler neck.

Cap 10 is easily removed from filler neck 22 during refueling by rotating handle cover 12 about axis of rotation 42 through a first "lost-motion" stage and then through a second "direct-drive" stage. This two-stage operation is shown in FIGS. 3, 5, 7, and 16–18.

Figure 3:
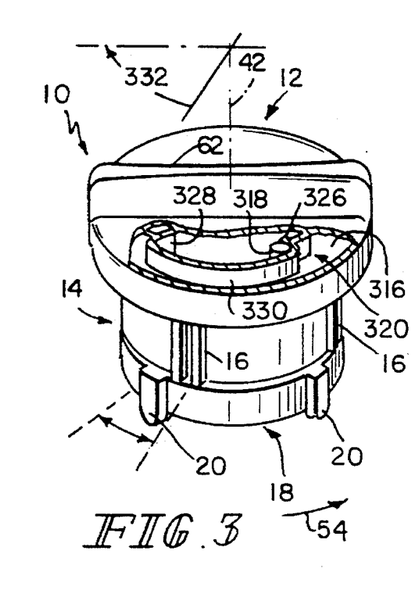
FIG. 3 is a perspective view of the cap of FIG. 1 as it would appear in the filler neck during cap installation after the handle cover has been rotated one-twelfth of a turn (30°) in a cap-advancing direction relative to the filler neck using the direct-drive driving connection and after vertical retaining lugs at the base of the closure body have been rotated into engagement with internal flanges in the filler neck to anchor the closure body in the filler neck and trap a sealing ring between the closure body and the filler neck.
Figures 5, 6:
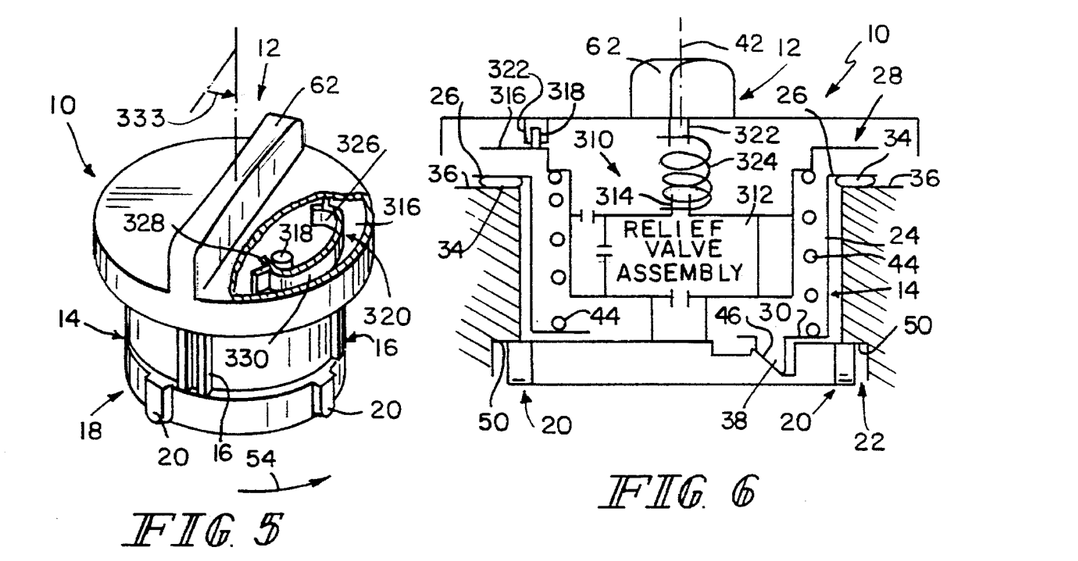
FIG. 5 is a perspective view of the cap of FIG. 1 as it would appear in the filler neck during an initial stage of cap removal after the handle cover has been rotated one-sixth of a turn (60°) in a cap-removal direction relative to the closure body and the filler neck using a lost-motion driving connection which causes the C-shaped drive lug appended to the underside of the handle cover to rotate through a 60° "lost-motion" angle without moving the driven lug appended to the underlying closure body and breaking the liquid fuel and fuel vapor seal established between the closure means and the filler neck.
FIG. 6 is a diagrammatic view of the cap of FIG. 5 showing the sealing ring in its compressed state between the closure body and the filler neck following a 60° "lost-motion" rotation of the handle cover relative to the closure body in a cap-removal direction.

First, cap 10 is twisted one-sixth of a revolution (60°) through a lost-motion angle 332 in a counterclockwise or cap-removal direction 54 from the position shown in FIG. 3 to the position shown in FIG. 5. It will be understood that this is called a lost-motion stage because the user is able to rotate handle cover 12 through a 60° angle without turning core 18 in filler neck 22 because the C-shaped drive lug 320 moves relative to its companion fixed cylindrical driven lug 318. Essentially, the fixed cylindrical driven lug 318 engages the first arm 326 of drive lug 320 at the start of this first stage, engages the elongated annular body 330 during lost-motion rotation of handle cover 12 in a cap-removal direction 54, and engages the second arm 328 of drive lug 320 at the end of this first stage (and the start of the second stage).

Figures 7, 8:
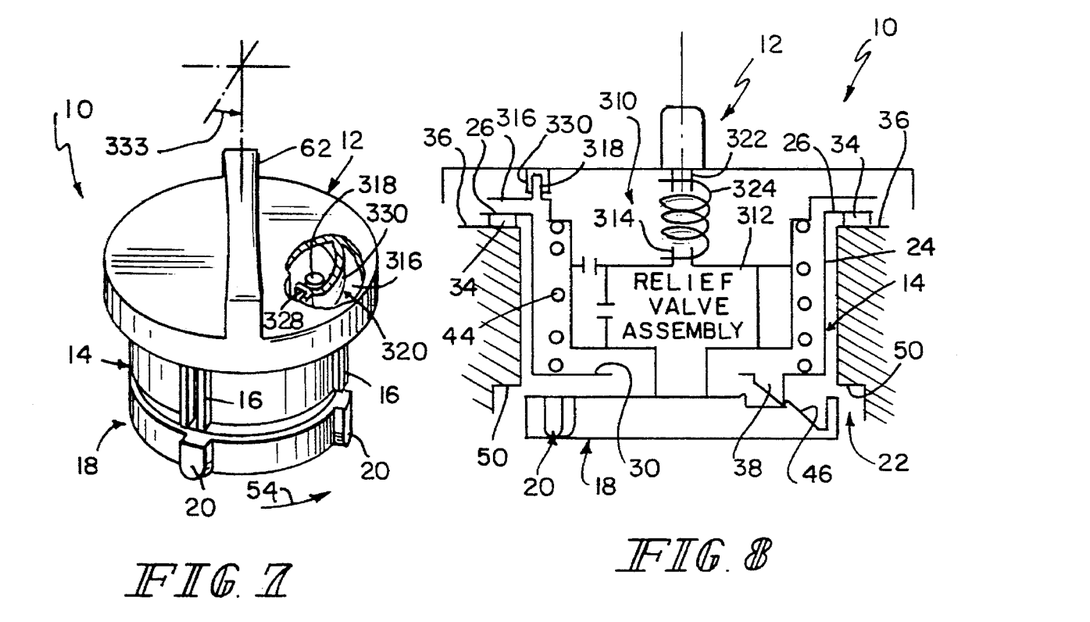
FIG. 7 is a perspective view of the cap of FIG. 1 as it would appear in the filler neck during a second stage of cap removal after the handle cover has been rotated another 30° in the cap-removal direction past the position illustrated in FIG. 5 using a now-active direct-drive driving connection and after the vertical retaining lugs at the base of the closure body have been rotated out of engagement with internal flanges in the filler neck to disengage the closure body and the filler neck.
FIG. 8 is a diagrammatic view of the cap of FIG. 7 showing the sealing ring in its uncompressed state between the closure body and the filler neck following a total 90° rotation of the handle body relative to the filler neck in a cap-removal direction.

Second, cap 10 is twisted one-twelfth of a revolution (30°) through a direct-drive angle 333 in cap-removal direction 54 from the position shown in FIG. 5 to the position shown in FIG. 7. It will be understood that this is called a direct-drive stage because the core 18 turns in filler neck 22 about axis of rotation 42 directly in response to rotation of handle cover 12 through a 30° angle. Now, as shown diagrammatically in FIG. 8, the retaining lug 20 is withdrawn from its cap-anchoring position engaging the internal flange 50 formed in the filler neck 22.

The cap 10 is now in a position where it can be withdrawn easily from the mouth of the filler neck 22. Once the cap 10 is withdrawn, the wound torsion spring 324 "unwinds" and rotates the core 18 relative to handle cover 12. This snap-back action resets the cap 10 from the configuration shown in FIG. 7 to the configuration shown in FIG. 1. Essentially, the core 18 rotates about axis of rotation 42 so that the cylindrical driven lug 318 now engages the first arm 326 of the C-shaped drive lug 320 as shown in FIG. 1 to establish a direct-drive connection that functions during cap installation.

Figure 9:
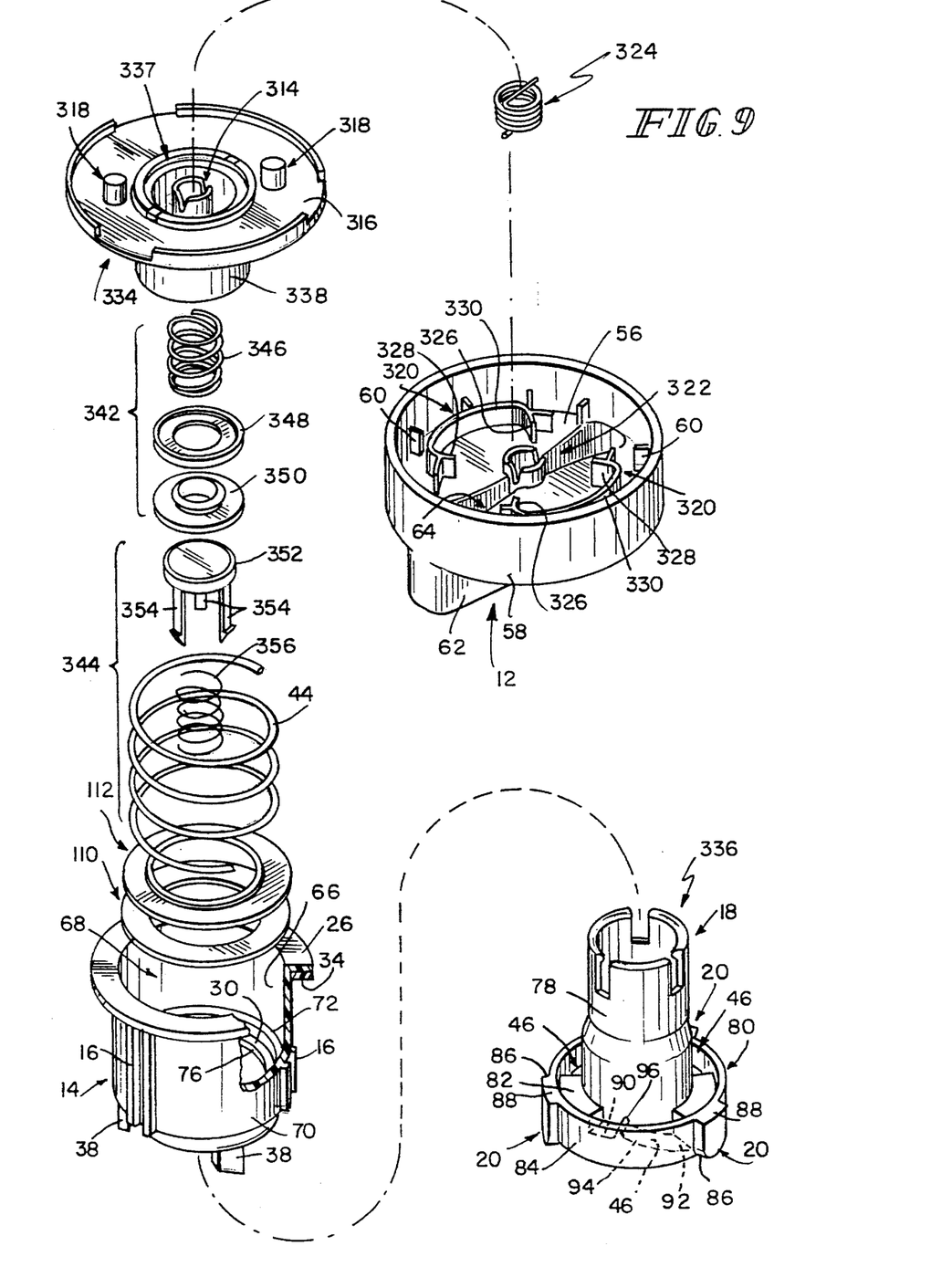
FIG. 9 is an exploded perspective view of a preferred embodiment of the quick-on cap of FIG. 1 showing a handle cover including two opposing C-shaped drive lugs, a torsion spring, an upper part of the closure body including two spaced-apart cylindrical driven lugs, various components of a pressure-relief and vacuum-relief valve assembly, a middle part of the closure body including three downwardly extending cam followers, and a lower part of the closure body for containing the valve assembly and engaging both the cam followers and internal mounting flanges provided in the filler neck.

An exploded perspective view of the quick-on cap 10 of FIGS. 1, 3, 5, and 7 is provided in FIG. 9 to illustrate a preferred embodiment of the various components in the cap 10. Handle cover 12 includes a circular top wall 56, annular perimeter side wall 58, a plurality of radially inwardly projecting lugs 60, and a hollow grip handle 62 formed to include an elongated axially inwardly opening channel 64 extending across the diameter of the circular top wall 56. The handle cover 12 is used in the manner described below to rotate the core 18 inside sleeve 14 because of a coupling between handle cover 12 and core 18.

Figure 11:
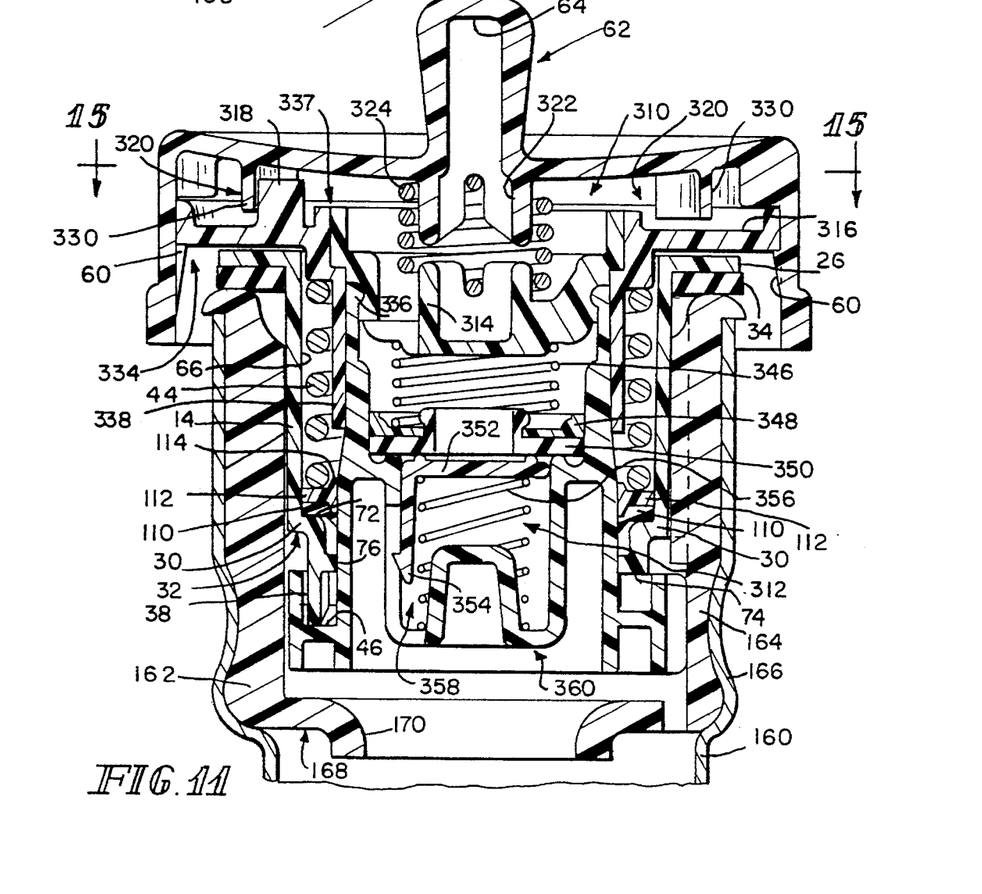
FIG. 11 is a section through the quick-on cap of FIG. 10 after the cap is inserted into the filler neck of FIG. 10 but before the handle cover and closure body are rotated relative to the filler neck by a user.

Sleeve 14 is preferably formed as illustrated in FIG. 9 so that the axially extending cylindrical body 24 includes an annular interior side wall 66 defining a cylindrical inner chamber 68 for receiving an assembly including spring 44 therein. The cylindrical body 24 also includes an annular exterior side wall 70 and the three anti-rotation ribs 16 are formed to lie in spaced-apart relation to one another about the circumference of exterior side wall 70. As best shown in FIG. 11, the cylindrical body 24 is formed to include a radially inwardly projecting middle annular flange 72 which is located along the annular interior side wall 66 between the previously described bottom flange 30 and top flange 26 on sleeve 14. As also shown in FIG. 11, the inner end 32 of sleeve 14 extends downwardly from the annular middle flange 72. The three cam followers 38 on sleeve 14 are appended to the annular bottom edge 74 of inner end 32 and are arranged to extend in an axially inner direction to engage the three cylindrical cams 46 formed in core 18. A concentric core-receiving aperture 76 is formed in the bottom of sleeve 14 as shown in FIGS. 9 and 11.

Core 18 is preferably formed as illustrated in FIG. 9 to include an axially extending necked-down tubular body 78 that is sized to fit through the core-receiving aperture 76 formed in the inner end 32 of sleeve 14 and extend into the cylindrical inner chamber 68 formed in sleeve 14. The core 18 also includes a ring 80 appended to a lower end of the tubular body 78 by an annular web 82. The three retaining lugs 20 are appended to an exterior wall 84 of ring 80 and arranged to lie in spaced-apart relation around the circumference of exterior wall 84. Each retaining lug 20 includes a stop face 86 for engaging an internal flange in the filler neck 22 to limit rotation of core 18 in filler neck 22 and an anchor face 88 for engaging another internal flange in the filler neck 22 to block withdrawal of the core 18 from the filler neck 22.

Figure 12:
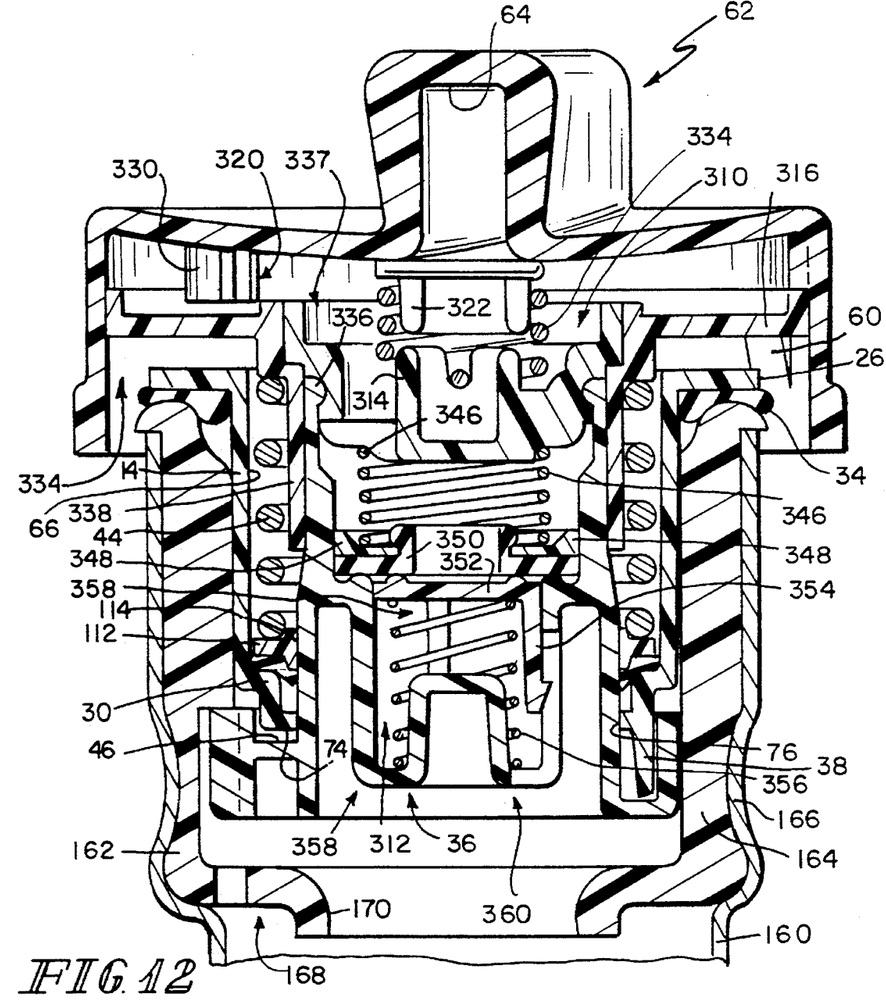
FIG. 12 is a view similar to FIG. 11 showing the quick-on cap after the handle cover has been rotated one-twelfth of a revolution (30°) in a clockwise cap-advancing direction to anchor the closure body to internal flanges in the filler neck and compress the sealing ring between a top flange on the upper part of the closure body and an annular rim at the mouth of the filler neck.
Figure 13:
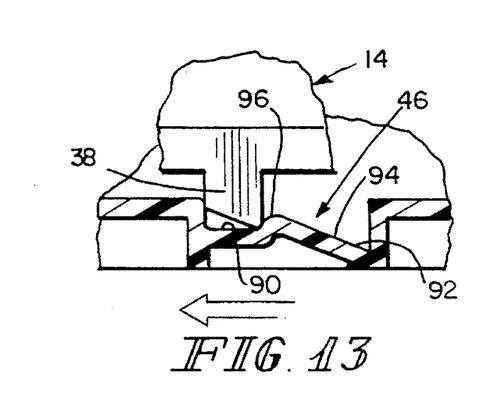
FIG. 13 shows a flat development of one of the downwardly extending cam followers on the middle part of the closure body resting on a top portion of one of the cams provided on the lower part of the closure body in the condition shown in FIG. 2.
Figure 14:
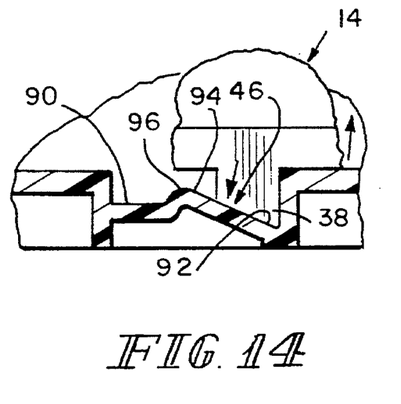
FIG. 14 is a view similar to FIG. 13 showing the spring-loaded cam follower as it is cammed toward the position shown in FIG. 4 during rotation of the handle cover and closure body one-twelfth of a turn (30°) in a clockwise cap-advancing direction relative to the filler neck.

Three cylindrical cams 46 are formed in the annular web 82 and presented upwardly to be engaged by the three downwardly extending cam followers 38 appended to sleeve 14 as shown best in FIGS. 9, 13, and 14. A flat development of each cylindrical cam 46 is shown in FIGS. 13 and 14. The cam angles are selected to assist rotation of the core 18 in the cap-installation direction. Each cam 46 includes a top platform 90 for supporting the spring-loaded cam follower 38 in an axially higher position shown in FIG. 13 corresponding to a "loosened condition" of cap 10 as shown diagrammatically in FIG. 2 and in more detail in FIG. 11. Each cam 46 also includes a bottom platform 92 for supporting the spring-loaded cam follower 38 in an axially lower position corresponding to a "tightened condition" of cap 10 as shown diagrammatically in FIG. 4 and in greater detail in FIG. 12.

A downwardly sloping cylindrical or helical ramp 94 connects the top and bottom platform 90, 92 of each cam 46 to guide the spring-loaded cam followers 38 between the top and bottom platforms 90, 92 in response to rotation of core 18 within filler neck 22 and relative to the non-rotatable sleeve 14. Also, a radially extending detent 96 is provided between each top platform 90 and ramp 94 to inhibit movement of the spring-loaded cam followers 38 off top platforms 90 and onto ramps 94 until enough torque is applied by a user to handle cover 12 to twist or rotate core 18 in the filler neck 22. In practice, the detents 96 advantageously prevent rotation of core 18 relative to sleeve 14 when the quick-on cap 10 is not installed on a filler neck.

The cam 46 and cam follower 38 arrangement just described constitute means for releasing the spring means 44 in response to rotational movement of the core in the cap-installation direction and for loading the spring means in response to rotational movement of the core in the opposite direction. The cam 46 on core 18 and the cam follower 38 on sleeve 14 thus cooperate to control movement of the annular sealing ring 34 on the sleeve into and out of sealing engagement with the sealing portion or seat 186 (see FIGS. 10 and 11) on the filler neck 22.

As shown best in FIGS. 9 and 11, a second sealing ring 110, a squeeze collar 112, and the spring 44 cooperate to provide an assembly for establishing a fuel vapor seal between the sleeve 14 and the core 18 that remains in place even during axial and rotational movement of the core 18 relative to sleeve 14. Squeeze collar 112 fits around tubular body 78 and lies in the annular space between the interior side wall 66 of the sleeve 14 and the exterior side wall of the tubular body 78. Squeeze collar 112 includes a rim 114 for pushing the resilient second sealing ring 110 against the annular bottom flange 30 on sleeve 14 under a load provided by spring 44 so as to spread the sealing ring 110 in a radially inward direction against the tubular body 78 and in a radially outward direction against an interior side wall of the inner end 32 of sleeve 14 as shown, for example, in FIGS. 11 and 12.

As shown in FIG. 9, an upper core 334 is configured to fit between handle cover 12 and sleeve 14 and connect to the upper end 336 of core 18. Upper core 334 includes upper plate 316 which carries the spaced-apart cylindrical driven lugs 318. The bottom spring mount 314 is formed in a round plug 337 that is mounted in an aperture formed in the center of upper plate 316 as shown, for example, in FIGS. 9 and 11. Upper core 334 is preferably molded of a plastics material as a single piece and is formed to include a somewhat cylindrical tubular member 338 having a central passageway 340 receiving the plug 337 containing bottom spring mount 314 and also the upper end 336 of core 18 as shown best in FIG. 11.

A pressure-relief valve assembly 342 and a vacuum-relief valve assembly 344 are mounted in the interior region of the tubular body to control flow of fuel vapor out of the filler neck 22 and atmospheric air into the filler neck 22. Pressure-relief valve assembly 352 includes pressure-relief spring 346, annular valve plate 348, and pressure-relief valve 350. Vacuum-relief valve assembly 344 includes vacuum-relief valve 352 having three footed guide legs 354 and vacuum-relief spring 356. The pressure-relief valve assembly 342 is mounted inside core 18 in a position underneath the round plug 337 containing the bottom spring mount 314 as shown in FIG. 11. The vacuum-relief valve assembly 344 is mounted in an interior region 358 formed in a receptacle 360 appended to core 18 as shown in FIG. 11. Reference is hereby made to U.S. patent application No. 08/239,041, pending entitled "Valve Assembly for a Fuel Tank Filler Neck Cap," filed on May 6, 1994, which application is incorporated by reference herein, for a detailed description of the structure, function, and operation of this pressure-vacuum valve assembly.

Figure 10:
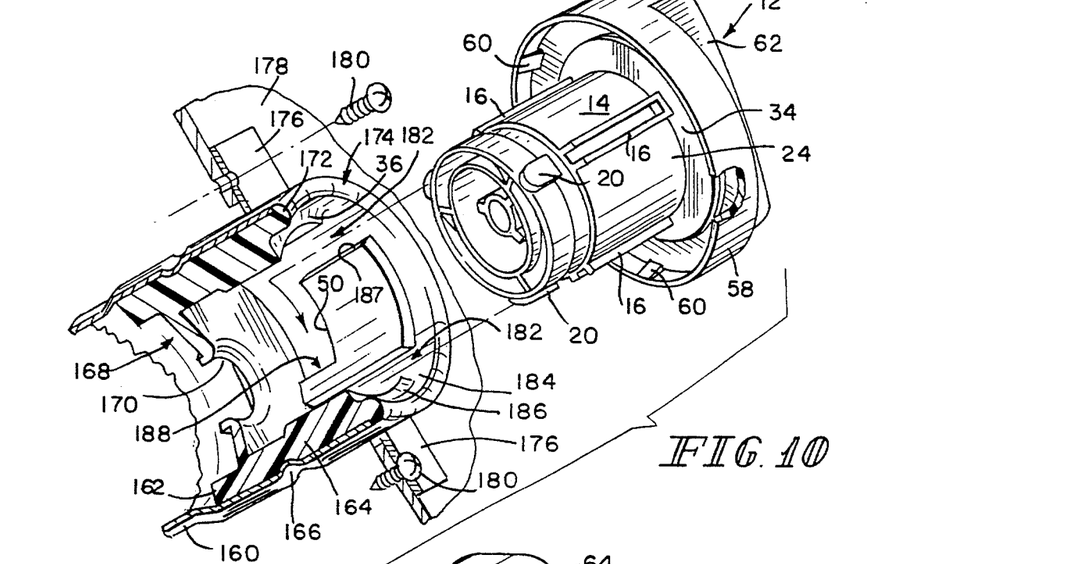
FIG. 10 is a perspective view of the quick-on cap of FIG. 9 as it is about to be inserted into a filler neck provided with various internal mounting flanges.

Filler neck 22 is shown in more detail in FIG. 10. Filler neck 22 illustratively includes a sheet metal fill tube 160 and a molded plastic insert 162. Insert 162 includes external threads 164 for threadedly engaging the threaded outer end 166 of fill tube 160. A partition wall 168 is formed in insert 162 to include an aperture 170 sized to receive an unleaded fuel-dispensing nozzle (not shown) of the type used to pump fuel into a filler neck. Insert 162 also includes an annular outer lip 172 and the distal end 174 of fill tube 160 is deformed as shown in FIG. 10 to embrace the annular outer lip 172 and hold the insert 162 in place in fill tube 160 as shown in FIG. 10. Exterior mounting flanges 176 are appended to fill tube 160 to permit filler neck 22 to be mounted to vehicle 178 easily using fasteners 180.

As shown in FIG. 10, the interior of filler neck insert 162 is formed to include internal flanges that define slots for receiving and guiding the three retaining lugs 20 that are appended to the core 18. An axially extending slot 182 is provided for receiving each of the three retaining lugs 20 as the quick-on cap 10 is thrust into the cap-receiving aperture 184 defined by the annular sealing ring-receiving seat 186 formed by annular rim 36 in filler neck insert 162. As the cap 10 is inserted into filler neck 22, the three retaining lugs 20 pass out of the three axially extending slots 182 and are held in a position ready to be moved into the circumferentially extending slots 188. However, the three anti-rotation ribs 16 on sleeve 14 are retained in the three axially extending slots 182 and engage the internal flanges 187 defining those slots to block rotation of sleeve 14 in filler neck 22 without inhibiting rotation of core 18 relative to sleeve 14 and filler neck 22.

Once the cap 10 has been inserted into filler neck 22 and moved axially inwardly so that the annular sealing ring 34 is loosely resting on the annular rim 36 of filler neck 22, the cap 10 is in its loosened position and ready to be tightened. A user simply needs to rotate the handle cover 12 about longitudinal axis a fraction of a turn (e.g., 30°, one-twelfth of a revolution). Rotation of handle cover 12 causes upper core 334 and core 18 to rotate relative to the filler neck 22 and the non-rotatable sleeve 14 so that the three retaining lugs 20 appended to core 18 rotate into the three circumferentially extending slots 188 formed in filler neck 22. Once moved into slots 188, the axially outwardly facing anchor face 88 on each retaining lug 20 is positioned to engage the internal flange 50 in filler neck 22 and thereby block removal of cap 10 from filler neck 22.

As the core 18 rotates about its longitudinal axis, the three cylindrical cams 46 on core 18 are rotating to allow spring 44 to be released to urge the sleeve 14 and core 18 in opposite directions so that the three cam followers 38 and sleeve 14 move in an axially inward direction. In effect, spring 44 (through outer lid 118, tubular member 78, ring 80, and retaining lugs 20) pushes against internal flange 50 of filler neck 22 as shown in FIG. 12 to move sleeve 14 in the axially inward direction. It will be understood that the three anti-rotation ribs 16 appended to sleeve 14 and lying in the three axially extending slots 182 are free to move axially in said axially extending slots 182 even though they engage internal flanges 187 to block rotation of the sleeve 14 in filler neck 22. Therefore, the three cams 46 on core 18 operate to allow the spring 44, which is always applying an axially inwardly directed load to the sleeve 14 through the squeeze collar 112, to move the sleeve 14 further in the axially inward direction into filler neck 22. This will cause the main annular sealing ring 34 that is carried on the annular top flange 26 of sleeve 14 to be compressed between the annular top flange 26 and the annular seat 186 on annular rim 36 to establish a tight fuel vapor seal therebetween without scuffing the main annular sealing ring 34.

The sealing ring 34 is moved axially into engagement with the annular seat 186 on the filler neck insert 162 by the annular top flange 26 of sleeve 14. This allows the sealing ring 34 to be moved gently against the annular seat 186 in such a way as to avoid the time of scuffing that usually happens to O-rings that are rotated into frictional engagement with a filler neck. As a result, it is possible to form sealing 34 out of a more pliant material which provides a better fuel vapor seal between the cap 10 and filler neck 22. Advantageously, a compliant sealing ring 34 is able to establish a tight fuel vapor seal against a filler neck even though the filler neck may suffer from dimensional irregularities, nicks caused by banging with fuel-dispensing nozzles during refueling or other external or internal damage or flaws.

Of course, the spring 44 also applies a load to the squeeze collar 112 and the second sealing ring 110 to establish a fuel vapor seal between the sleeve 14 and core 18. Venting of fuel vapor from filler neck 22 to the atmosphere and admission of ambient air into the filler neck 22 while the cap 10 is mounted on the filler neck 22 is controlled by the pressure-vacuum-relief assembly 142 mounted inside the tubular member 78 of core 18.

A sequence of operation of a preferred embodiment of cap 10 showing a direct-drive feature during cap installation, a two-stage lost-motion and direct-drive feature during cap removal, and an automatic reset feature of cap 10 following withdrawal of the cap 10 from its filler neck 22 is illustrated in FIGS. 15–19. As shown in these drawings, cap 10 in its preferred embodiment includes two spaced-apart opposing C-shaped drive lugs 320, each drive lug 320 receiving one of the cylindrical driven lugs 318 therein, and the torsion spring 324 is mounted to lie midway between the two opposite drive lugs 320.

Figures 15, 16, 17, 18:
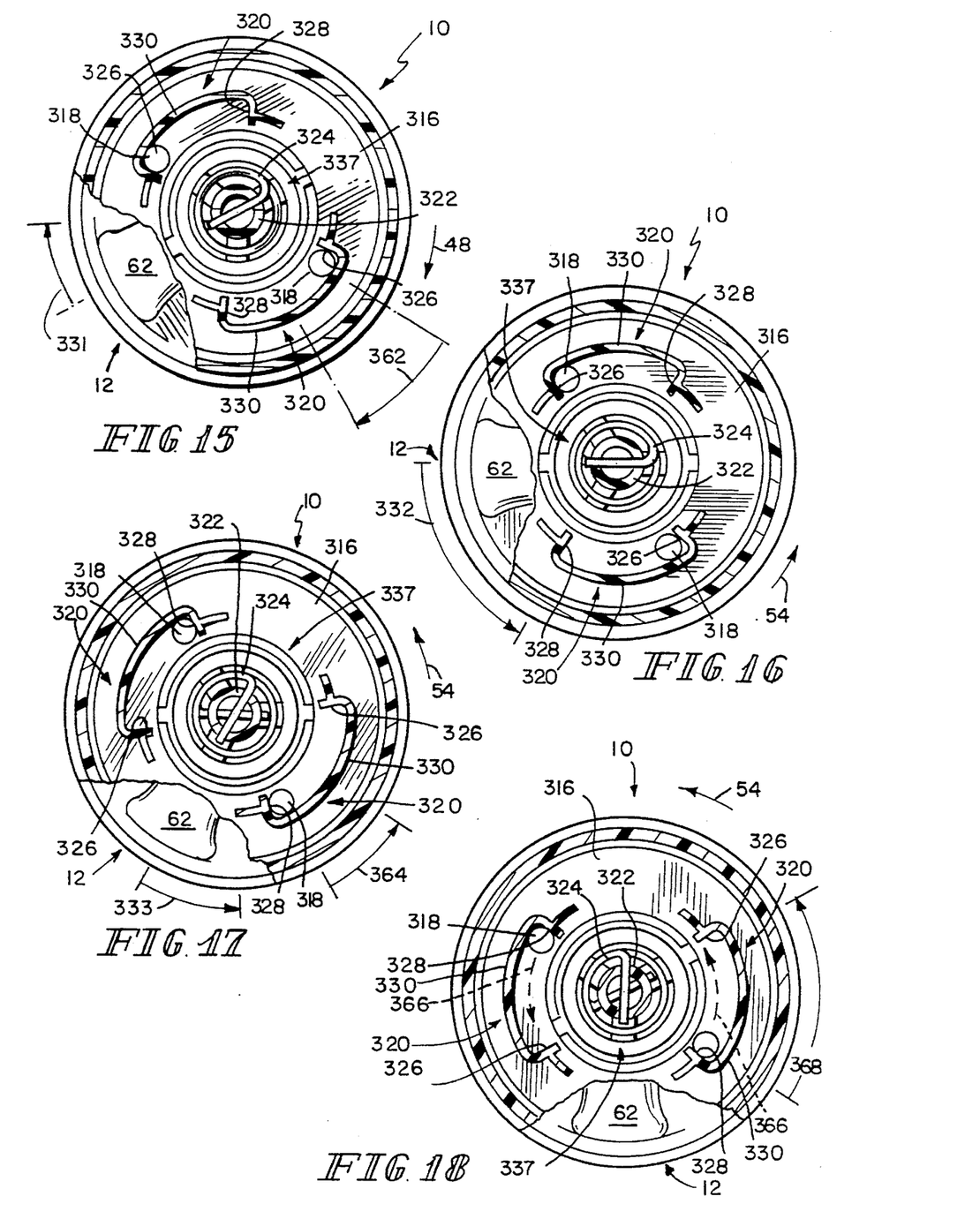
FIG. 15 is a section taken along line 15—15 of FIG. 11 showing the cap in the position shown in FIGS. 2 and 10.
FIG. 16 is a view similar to FIG. 15 during cap installation after the handle cover and closure body have been rotated one-twelfth of a turn (30°) in a clockwise cap-advancing direction relative to the filler neck to the filler neck-closing position shown in FIGS. 4 and 11.
FIG. 17 is a view similar to FIGS. 15 and 16 during a first "lost-motion" stage of cap removal after the handle cover has been rotated through a 60° lost-motion angle relative to the filler neck and the closure body sealed to the filler neck.
FIG. 18 is a view similar to FIGS. 15–17 during a second "direct-drive" stage of cap removal after the handle cover and closure body have been rotated through a 30° direct-drive angle relative to the filler neck.

Cap 10 as it would appear before it is installed in filler neck 22 is illustrated in FIG. 15. In this view, torsion spring 324 biases cylindrical driven lugs 318 into engagement with the first arms 326 of the C-shaped drive lugs 320 to establish a direct-drive driving connection between handle cover 12 and core 18. To anchor the cap 10 in filler neck 22, the grip handle 62 on handle cover is rotated 30° in a clockwise, cap-advancing direction 48 as represented by direct-drive angle 331. Such rotation causes drive lug 320 to rotate driven lug 318 30° (as represented by angle 362) from the loose position shown in FIG. 15 to the sealed filler neck-closing position shown in FIG. 16.

To remove cap 10 from filler neck 22, two stages of rotation of handle cover 12 are needed. First, handle cover 12 is rotated 60° in a counterclockwise, cap-removal direction 54 as represented by first lost-motion stage angle 332. Such "lost motion" rotation causes drive lug 320 to rotate 60° relative to the "fixed" driven lug 318 from the initial position shown in FIG. 16 (where driven lug 318 engages first arm 326) to the direct-drive position shown in FIG. 17 (where driven lug 318 engages second arm 328). At this point, any further counterclockwise rotation of handle cover 12 will result in rotation of core 18 because of the direct-drive driving connection established between the second arm 328 of drive lug 320 and the driven lug 318.

During the second stage of cap removal, handle cover 12 is rotated 30° in the counterclockwise, cap-removal direction 54 as represented by direct-drive angle 333. Such rotation causes drive lug 320 to rotate driven lug 318 30° (as represented by angle 364) from the sealed filler neck-closing position shown in FIG. 17 to the loose position shown in FIG. 18.

At this point, the user will withdraw cap 10 form filler neck 22 by pulling it out of the filler neck 22. As soon as cap 10 clears the filler neck 22, torsion spring 324 takes over and automatically resets cap 10 to the configuration needed to reestablish a direct-drive driving connection when the cap is reinstalled in the filler neck 22. The handle cover 12 is fixed against rotation because it is being held by the user while the cap 10 is being withdrawn from the filler neck 22. Thus, the core 18 is free to rotate relative to handle cover 12.

Figure 19:
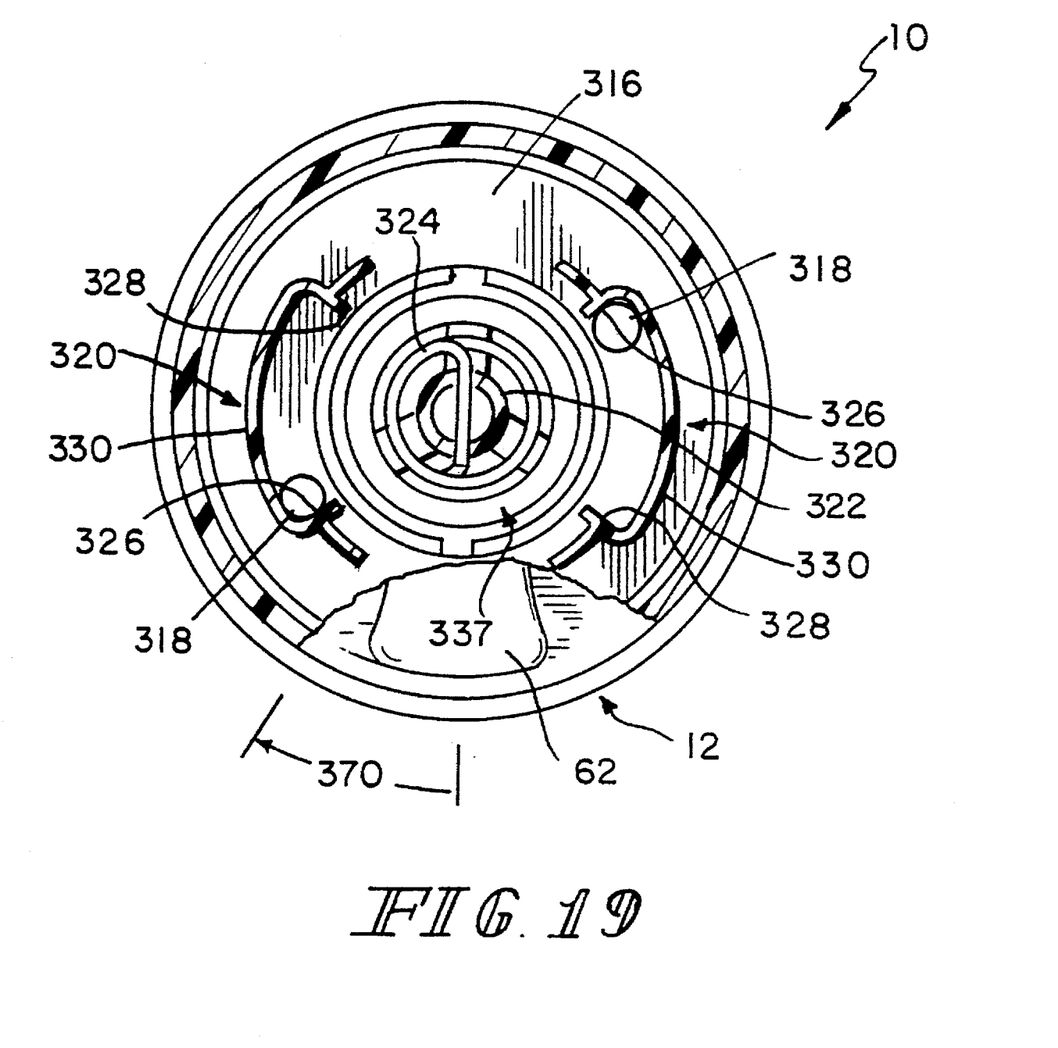
FIG. 19 is a view similar to FIGS. 15–18 after the cap has been removed from the filler neck and the torsion spring instantly expands and rotates the closure body through a 60° "snap-back" angle to its original position so that a direct-drive connection between the handle cover and the closure body is reestablished automatically for use whenever the cap is reinstalled in the filler neck.

Once cap 10 is removed from filler neck 222, wound torsion spring 324 unwinds and rotates core 18 relative to handle cover 12, causing cylindrical driven lugs 318 to move along dotted line paths 366 through a 60° angle (as represented by angle 368) from the "just-removed" position shown in FIG. 18 to the "ready-to-install" position shown in FIG. 19.

Referring to FIG. 19, it will be understood that cap 10 is ready to be reinstalled in filler neck 22 because driven lug 318 engages first arm 326 of drive lug 320 to establish a direct-drive driving connection operable during rotation of handle cover 12 in a cap-advancing direction. Illustratively, handle cover 12 could be rotated 30° in a clockwise, cap-advancing direction as represented by direct-drive angle 370 to once again anchor cap 10 in filler neck 22.

Although the invention has been described in detail with reference to certain preferred embodiments, variations and modifications exist within the scope and spirit of the invention as described and defined in the following claims.

We claim:

1. A cap engageable with a filler neck having a mouth, the cap comprising closure means for closing the filler neck, the closure means having an axis of rotation, handle means for rotating the closure means about the axis of rotation and relative to the filler neck in one of a cap-installation direction toward the filler neck and a cap-removal direction away from the filler neck, and control means for providing a lost-motion driving connection between the handle means and the closure means during rotation of the handle means about the axis of rotation relative to the filler neck in a cap-removal direction and for the handle means against the closure means to provide a direct-drive driving connection between the handle means and the closure means during rotation of the handle means about the axis of rotation in a cap-advancing direction.

2. The cap of claim 1 wherein the bias is created by a spring coupled to the closure and the handle means.

3. A cap engageable with a filler neck having a mouth, the cap comprising closure means for closing the filler neck, the closure means having an axis of rotation, handle means for rotating the closure means about the axis of rotation and relative to the filler neck in one of a cap-installation direction toward the filler neck and a cap-removal direction away from the filler neck, and control means for providing a lost-motion driving connection between the handle means and the closure means during rotation of the handle means about the axis of rotation relative to the filler neck in a cap-removal direction and providing a direct-drive driving connection between the handle means and the closure means during rotation of the handle means about the axis of rotation in a cap-advancing direction, the control means including a torsion spring coupled to the closure means and the handle means.

4. The cap of claim 3, wherein the closure means includes a valve housing containing a pressure-relief valve and a vacuum-relief valve and the torsion spring includes a first finger coupled to the handle means, a second finger coupled to the valve housing, and a coiled portion appended to the first and second fingers.

5. The cap of claim 3, wherein the control means further includes a drive lug coupled to the handle means and a driven lug coupled to the closure means, the handle means includes a top spring mount in spaced-apart relation to the drive lug, the closure means includes a bottom spring mount in spaced-apart relation to the driven lug, the torsion spring includes a top finger coupled to the top spring mount, a bottom finger coupled to the bottom spring mount, and a coiled portion interconnecting the top and bottom ends and having a central axis, and the torsion spring is oriented to lie between the handle means and the closure means and to align the central axis in parallel relation to the axis of rotation of the closure means.

6. The cap of claim 3, wherein the control means further includes a drive lug coupled to the handle means and a driven lug coupled to the closure means, the drive lug includes installation drive means for engaging the driven lug during rotation of the handle means to rotate the closure means in the cap-installation direction and removal drive means for engaging the driven lug during rotation of the handle means to rotate the closure means in the cap-removal direction, and the torsion spring yieldably biases the driven lug on the closure means into engagement with the installation drive means on the handle means.

7. The cap of claim 6, wherein the drive lug is a C-shaped member having an elongated annular body, a first arm located at one end of the elongated annular body and configured to define the installation drive means, and a second arm located at an opposite end of the elongated annular body facing toward the first arm and configured to define the removal drive means.

8. The cap of claim 6, wherein the handle means includes a top spring mount in spaced-apart relation to the drive lug, the closure means includes a bottom spring mount in spaced-apart relation to the driven lug, the torsion spring includes a top finger coupled to the top spring mount, a bottom finger coupled to the bottom spring mount, and a coiled portion interconnecting the top and bottom ends and having a central axis, and the torsion spring is oriented to lie between the handle means and the closure means and to align the central axis in parallel relation to the axis of rotation of the closure means.

9. The cap of claim 6, wherein the closure means includes a cylindrical sleeve, an annular flange appended to the cylindrical sleeve, an annular seal coupled to the annular flange and arranged to lie around the cylindrical sleeve, and a core assembly having a lower portion lying inside the cylindrical sleeve and an upper portion lying above the annular flange and annular seal, and the driven lug is appended to the upper portion of the core assembly and arranged to extend along a vertical axis toward the handle means.

10. A cap engageable with a filler neck having a mouth, the cap comprising closure means for closing the filler neck, the closure means having an axis of rotation, handle means for rotating the closure means about the axis of rotation and relative to the filler neck in one of a cap-installation direction toward the filler neck and a cap-removal direction away from the filler neck, and control means for providing a lost-motion driving connection between the handle means and the closure means during rotation of the handle means about the axis of rotation relative to the filler neck in a cap-removal direction and providing a direct-drive driving connection between the handle means and the closure means during rotation of the handle means about the axis of rotation in a cap-advancing direction, the control means interconnecting the closure means and the handle means to provide means for limiting relative movement of the closure means and the handle means to establish first and second positions of the handle means relative to the closure means so that the handle means is mounted for limited rotation through a predetermined angle relative to the closure means between the first and second positions to establish said lost-motion driving connection, the control means further including spring means for yieldably biasing the handle means to the first position.

11. The cap of claim 10, wherein the means for limiting relative movement of the closure means and the handle means includes a pair of drive members coupled to the handle means and a driven lug coupled to the closure means for rotation therewith, a first of the drive members is situated to engage the driven lug during rotation of the handle means in a cap-installation direction to establish the first position of the handle means, and a second of the drive members is situated in spaced-apart relation to the first of the drive members to engage the driven lug during rotation of the handle means in the cap-removal direction to establish the second position of the handle means.

12. The cap of claim 11, wherein the spring means is a torsion spring having a first finger coupled to the handle means, a second finger coupled to the closure means, and a coiled portion appended to the first and second fingers.

13. A cap for use in the filler neck of a tank, the filler neck having an annular lip defining a mouth, the cap comprising gasket means, closure means blocking the filler neck for urging the gasket means against the annular lip to establish a seal blocking outward flow of fluid and vapor through the filler neck mouth, the closure means being movable relative to the filler neck between a gasket means-releasing position breaking said seal and a gasket means-tightening position establishing said seal during movement of the closure means in the filler neck, and handle means urged to a position so as to apply a direct driving force to move the closure means relative to the annular lip of the filler neck in a cap-advancing direction from the gasket means-releasing position breaking said seal to the gasket means-tightening position establishing said seal during installation of the closure means in the filler neck, the closure means and the handle means cooperating to provide means for permitting relative movement between the closure means and the handle means to delay establishment of a driving connection between the closure means and the handle means during movement of the handle means in a cap-removal direction.

14. The cap of claim 13 wherein the bias is created by a spring coupled to the closure and the handle means.

15. The cap of claim 13, wherein the closure means includes a cylindrical sleeve and an annular flange appended to the cylindrical sleeve and the gasket means is an annular seal coupled to the annular flange and arranged to lie around the cylindrical sleeve.

16. A cap for use in the filler neck of a tank, the filler neck having an annular lip defining a mouth, the cap comprising gasket means, closure means blocking the filler neck for urging the gasket means against the annular lip to establish a seal blocking outward flow of fluid and vapor through the filler neck mouth, the closure means including a cylindrical sleeve and an annular flange appended to the cylindrical sleeve, the gasket means being an annular seal coupled to the annular flange and arranged to lie around the cylindrical sleeve, the closure means being movable relative to the filler neck between a gasket means-releasing position breaking said seal and a gasket means-tightening position establishing said seal during movement of the closure means in the filler neck, and handle means for applying a direct driving force to move the closure means relative to the annular lip of the filler neck in a cap-advancing direction from the gasket means-releasing position breaking said seal to the gasket means-tightening position establishing said seal during installation of the closure means in the filler neck, the closure means and the handle means cooperating to provide means for permitting relative movement between the closure means and the handle means to delay establishment of a driving connection between the closure means and the handle means during movement of the handle means in a cap-removal direction, the closure means further including a valve housing lying inside the cylindrical sleeve and containing a vent valve assembly, and a torsion spring coupled to the valve housing and the handle means.

17. The cap of claim 16, wherein the closure means further includes means for moving the cylindrical sleeve into the filler neck to urge the gasket means against the annular lip of the filler neck in response to rotation of the handle means in the cap-advancing direction, the moving means including a cam on the valve housing, a cam follower on the cylindrical sleeve, spring means for yieldably urging the cam follower into engagement with the cam, and the valve housing includes an upper core adjacent to the annular flange and a lower core coupled to the upper core and formed to include the cam, the closure means further includes a driven lug appended to the upper core, and the handle means includes a drive lug normally engaging the driven lug in response to a biasing force provided by the torsion spring.

18. A cap for use in the filler neck of a tank, the filler neck having an annular lid defining a mouth, the cap comprising gasket means, closure means blocking the filler neck for urging the gasket means against the annular lip to establish a seal blocking outward flow of fluid and vapor through the filler neck mouth, the closure means being movable relative to the filler neck between a gasket means-releasing position breaking said seal and a gasket means-tightening position establishing said seal during movement of the closure means in the filler neck, and handle means for applying a direct driving force to move the closure means relative to the annular lip of the filler neck in a cap-advancing direction from the gasket means-releasing position breaking said seal to the gasket means-tightening position establishing said seal during installation of the closure means in the filler neck, the closure means and the handle means cooperating to provide means for permitting relative movement between the closure means and the handle means to delay establishment of a driving connection between the closure means and the handle means during movement of the handle means in a cap-removal direction, the closure means including a closure assembly and a driven lug appended to the closure assembly, the handle means including an outer shell, a cap-installation drive lug appended to the outer shell, and spring means for yieldably biasing the cap-installation drive lug into engagement with the cap-installation driven lug normally to establish a direct-drive connection between the handle means and the closure means so that the cap-installation drive lug applies the direct-driving force to the driven lug to move the closure means to the gasket means-tightening position during movement of the handle means in the cap-advancing direction.

19. The cap of claim 18, wherein the permitting means includes a cap-removal drive lug situated in spaced-apart relation to the cap-installation drive lug and arranged to engage the driven lug during rotation of the handle means in the cap-removal direction to establish a delayed driving connection between the closure means and the handle means.

20. A cap engageable with a filler neck having a mouth, the cap comprising means for closing the mouth of the filler neck, the closing means including a core carrying a driven lug, a sleeve adjacent to the core, and a handle carrying a drive lug having a cap-installation arm and a cap-removal arm, the sleeve being movable relative to the core and carrying a sealing ring configured to engage the filler neck at the mouth upon insertion of the core in an axially inward direction into the filler neck, means for gripping the filler neck to compress the sealing ring between the sleeve and the filler neck so that a liquid and fuel vapor seal is established between the closing means and the filler neck in response to movement of the core relative to the sleeve in a cap-installation direction, the gripping means being coupled to the core and the sleeve, and spring means for yieldably biasing the cap-installation arm of the drive lug into engagement with the driven lug on the core so that a direct-drive driving connection is established between the handle and the core during rotation of the handle about an axis of rotation in a cap-advancing direction and the cap-removal arm of the drive lug is disengaged from the driven lug on the core until the handle has been rotated a predetermined amount relative to the core in a cap-removal direction.

21. The cap of claim 20, wherein the spring means is a torsion spring coupled to the handle and the core.

22. The cap of claim 20, wherein the handle includes a top spring mount in spaced-apart relation to the drive lug, the core includes a bottom spring mount in spaced-apart relation to the driven lug, and the torsion spring includes a top finger coupled to the top spring mount, a bottom finger coupled to the bottom spring mount, and a coiled portion interconnecting the top and bottom ends and having a central axis.

23. The cap of claim 22, wherein the torsion spring is oriented to lie between the handle and the core and to align the central axis in parallel relation to the axis of rotation of the handle.

24. The cap of claim 20, wherein the drive lug is a C-shaped member having an elongated annular body, the cap-installation arm is located at one end of the elongated annular body, and the cap-removal arm is located at an opposite end of the elongated annular body and arranged to face toward the cap-installation arm.

* * * * *

UNITED STATES PATENT AND TRADEMARK OFFICE
CERTIFICATE OF CORRECTION

Page 1 of 2

PATENT NO. : 5,480,055
DATED : January 2, 1996
INVENTOR(S) : Robert S. Harris et al.

It is certified that error appears in the above-indentified patent and that said Letters Patent is hereby corrected as shown below:

On the title page, item: [56] References Cited, the following references should be added:

U.S. PATENT DOCUMENTS

| | | |
|---|---|---|
| 3,006,499 | 10/1961 | Corbett |
| 3,820,680 | 6/1974 | Friend |
| 4,436,219 | 03/1984 | Reutter |
| 4,498,493 | 02/1985 | Harris |
| 4,887,733 | 12/1989 | Harris |

UNITED STATES PATENT AND TRADEMARK OFFICE
CERTIFICATE OF CORRECTION

Page 2 of 2

PATENT NO. : 5,480,055
DATED : January 2, 1996
INVENTOR(S) : Robert S. Harris et al.

It is certified that error appears in the above-indentified patent and that said Letters Patent is hereby corrected as shown below:

In Column 12, at line 10, "sealing 34" should be --sealing ring 34--.

In Column 12, at line 43, "handle cover is rotated" should be --handle cover 12 is rotated--.

In Column 13, at line 42 (claim 1), "urging" should be inserted after --for--.

In Column 16, at line 44 (claim 18), "lid" should be changed to --lip--.

Signed and Sealed this

Twenty-eighth Day of January, 1997

Attest:

BRUCE LEHMAN

Attesting Officer  Commissioner of Patents and Trademarks